Figure 1:
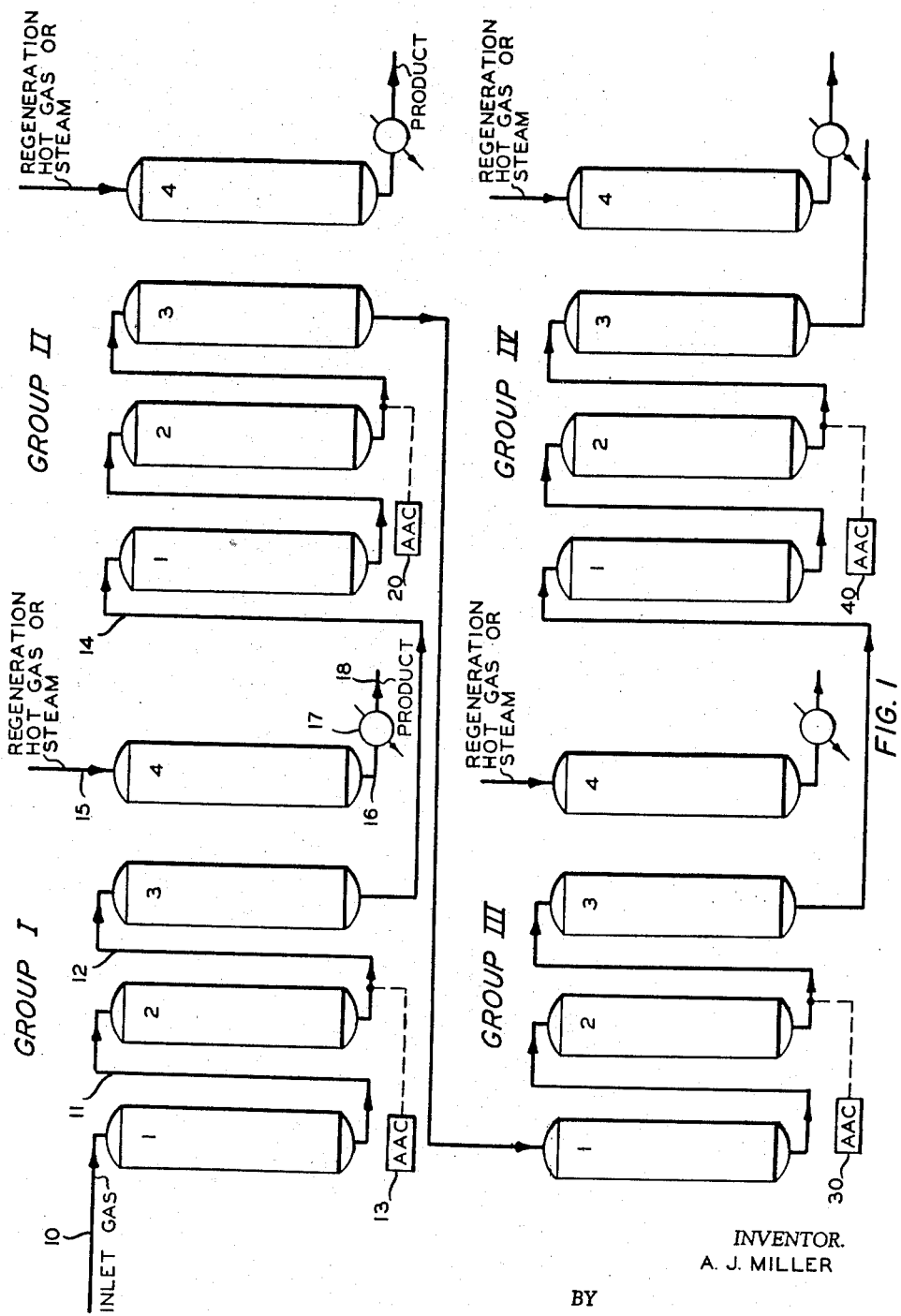

Dec. 31, 1963  A. J. MILLER  3,116,130
SEPARATION OF GASES AND LIQUIDS BY SORPTION
Filed Feb. 27, 1959  2 Sheets-Sheet 2

INVENTOR.
A. J. MILLER
BY
Hudson & Young
ATTORNEYS

United States Patent Office 3,116,130
Patented Dec. 31, 1963

3,116,130
SEPARATION OF GASES AND LIQUIDS
BY SORPTION
Alvin J. Miller, Bartlesville, Okla., assignor to Phillips
Petroleum Company, a corporation of Delaware
Filed Feb. 27, 1959, Ser. No. 795,952
5 Claims. (Cl. 55—19)

This invention relates to the separation of gases and liquids. In one of its aspects, the invention relates to a system of absorbers having for each constituent to be absorbed from a stream being passed therethrough a series or group of separate absorbers, the stream being passed serially through only, say, the first of each of said groups of absorbers until the effluent from said first absorber in any group shows an undesirable content of the gas or liquid to be absorbed in said first absorber and then passing said effluent into and through the second absorber of any group in which such content has been detected. In another of its aspects, the invention relates to the separation of gases, or hydrocarbons in natural gas, which comprises passing said gases serially through a plurality of groups or absorbers, and in each group downstream of an absorber of said group detecting in the gaseous stream any undesirable content of gas to be removed from said stream in said group while passing said effluent to another absorber of said group downstream of said an absorber and in each group taking into use an additional absorber whenever said undesirable content of gas to be removed but detected in the effluent exceeds a predetermined maximum. In a further aspect of the invention, it relates to the separation of hydrocarbons from natural gas which comprises passing said gas into the first of a series of absorbers adapted to absorb $C_5$ and heavier hydrocarbon from said gas, passing effluent from said first absorber to a second absorber, testing the effluent from said first absorber to determine its $C_5$ content when it has such a content, passing effluent from said second absorber to a third absorber whenever said content exceeds a predetermined value, thus obtaining from said third absorber when used a gas stream substantially free from $C_5$ hydrocarbon. In a further aspect still, the invention contemplates passing the effluent from a first group of a series of groups of absorbers, operated as described, to a second group of absorbers similarly operated to remove from said effluent, now free from $C_5$ hydrocarbon, $C_4$ hydrocarbon therein contained. Further, additional groups of absorbers, also operated as described, are employed to remove $C_3$, $C_2$ and lighter gases from said stream. In a still further aspect of the invention, upon regeneration of a used or saturated absorber, it is cooled using the effluent residue dry gas of the system. In a further aspect of the invention, it contemplates operations with liquids, as herein described in connection with gases. The liquids can be liquefied gases or normally liquid materials. Mixed phases can be treated.

The separation of gases and liquids by absorption is well known. The principle of absorption and materials and conditions for performing absorption or adsorption are also well known and understood. However, as is the case in any refining, purification, or separation operation, improved modus operandi which simplify or make more efficient or economical the overall results sought to be obtained or which lead more definitely to a pure product or to even a purer product are being continually sought.

Thus, while the concepts of preparing several pure gas streams and/or pure liquid streams from mixtures containing them are known, it has only recently been conceived that certain mixtures, for example, natural gas, can be efficiently separated into pure components by passing the mixtures serially through a series of groups of absorbers operated as herein described. The concepts underlying the operation herein described are believed to be the essence of the inventions claimed herein.

It is an object of this invention to provide a method for the separation of gases and/or liquids. It is another object of this invention to separate a mixture of gases contained, for example, in a natural gas, into its components in a once-through operation. It is a further object of this invention to so operate a plurality of absorbers that a mixture of gases and/or liquids fed serially through a plurality of them will be gradually depleted, in order of their several components, in a manner such that each of the components can be recovered as a substantially pure material.

Other aspects, objects and the several advantages of this invention are apparent from a study of this disclosure, the drawings, and the appended claims.

It will be clear to those skilled in the art that the invention herein described is of physical character and that it is widely applicable to mixtures of gaseous or vaporous and/or liquid substances. Accordingly, for purposes of disclosure required under the patent statutes and the practice, the invention now will be described as it relates to the separation of natural hydrocarbon gases into their respective components.

According to the invention, a natural gas containing $C_1$, $C_2$, $C_3$, $C_4$'s, and $C_5$ plus hydrocarbon is passed to the first absorber of a first group of absorbers of a series of groups of absorbers and from said first absorber to another absorber of said first group of absorbers and similarly to the first and second absorbers of each succeeding groups of absorbers while in each of said groups of absorbers detecting, respectively, $C_5$ plus, $C_4$'s, $C_3$, and $C_2$ in the effluent of each of the first absorber of each of said groups of absorbers and whenever in any of said effluents from a first absorber in any of said groups of absorbers there is an undesirable content of the gas fraction to be absorbed in said group of absorbers adding to said group an unused or regenerated absorber to insure that the gas stream leaving said group of absorbers and entering the succeeding group of absorbers in the series has been denuded substantially entirely of the said detected gas. Whenever an absorber in a group of absorbers is substantially saturated with the gas to be removed in said group of absorbers, this absorber is regenerated and can become the said additional absorber.

Figure 2:
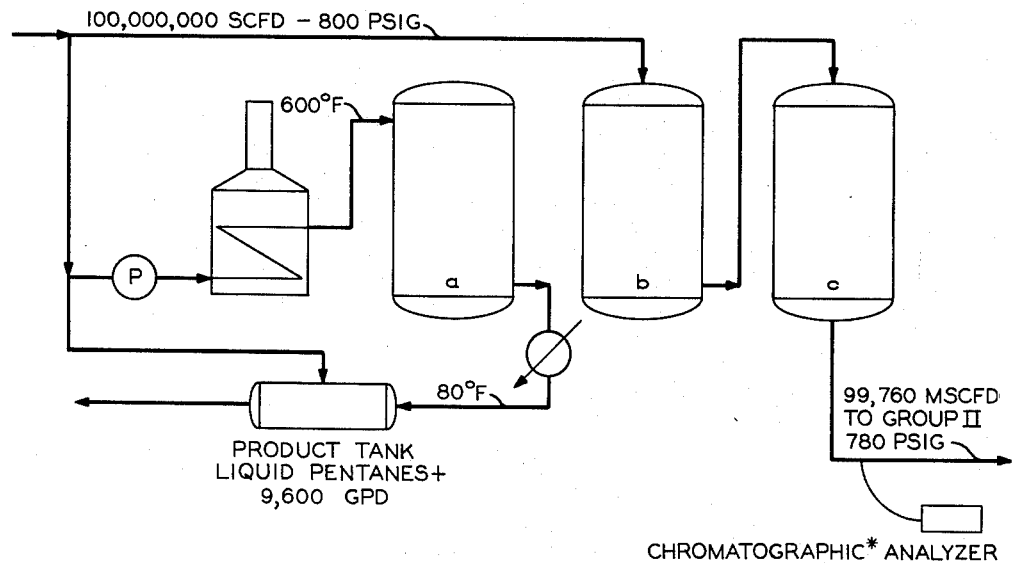
Figure 3:
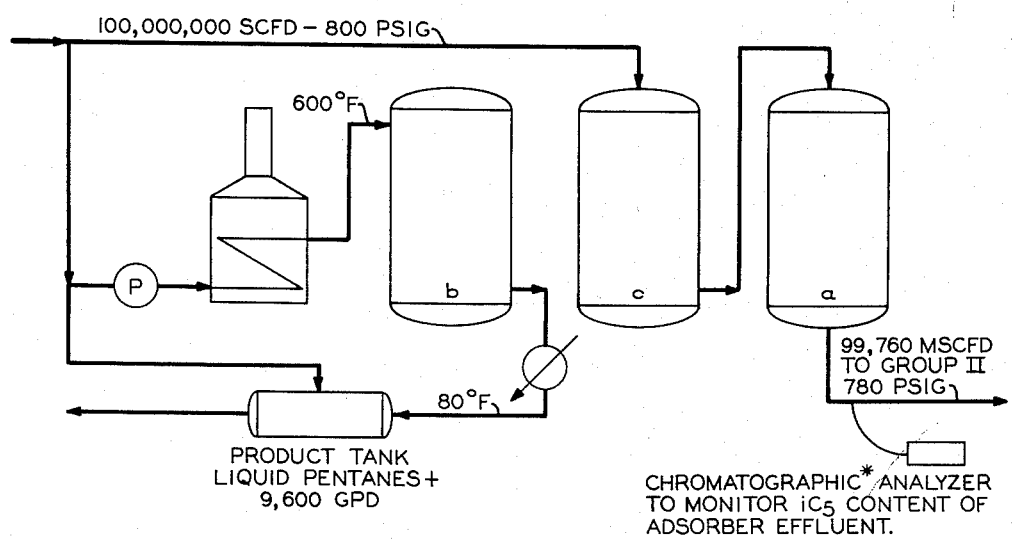

In the drawing, FIGURE 1 is a diagrammatic representation of a specific embodiment of the invention in which a natural gas stream is serially processed in four sets or groups of absorbers, any one or more of which can be operated according to the invention. FIGURES 2 and 3 represent at two different times the operation of a single group of absorbers according to the invention. It will be noted that, in FIGURES 2 and 3, the vessels are designated by "a," "b" and "c" and that the orders of these vessels, as designated in the two figures, are different.

Referring now to FIGURE 1 in which there is diagrammed a more specific embodiment of the invention, a natural gas stream is passed by pipe 10 to absorber No. 1 of group I of absorbers. These absorbers are operated acts to absorb $C_5$ plus hydrocarbons from the natural gas To this end, the absorbers are filled with silica gel which acts to absorb $C_5$ plus hydrocarbons from the natural gas which is passed therethrough. As shown in the drawing, effluent from absorber No. 1 passes to absorber No. 2 by way of pipe 11 and to absorber No. 3 by way of pipe 12. An automatic analyzer-controller adapted to analyze for $C_5$ plus hydrocarbon content of the gas in pipe 12 is shown diagrammatically at 13. So long as there is not an undesirable content of $C_5$ plus hydrocarbons in the stream passing through pipe 12, this stream is passed through absorber 3 and pipe 14 into absorber No. 1 of group II absorbers which are adapted to remove $C_4$'s and, to this end, are filled with activated charcoal. Returning to group I absorbers, it is seen that No. 4 absorber is on regeneration. This absorber is shown as having earlier been saturated with $C_5$ plus product. Hot regeneration gases or steam are passed through No. 4 by way of pipe 15 and removed together with desorbed $C_5$ plus product by way of pipe 16, cooler 17 and pipe 18. The hot regeneration gas is chosen to be readily separable from the $C_5$ plus product. To this end, it can be nitrogen. When steam is used, it is a simple matter to decant the condensed steam or water from the $C_5$ plus hydrocarbon product since two layers are formed, as will be understood by one skilled in the art. Though not shown for sake of simplicity, it will be understood that it is a part of the operation of the invention that whenever the automatic analyzer-controller 13 detects an undesirable amount of $C_5$ plus hydrocarbons in the effluent passing through pipe 12 regenerated absorber No. 4 will be switched into series so that the effluent in pipe 14 will first pass through absorber No. 4 and then into absorber No. 1 of group II of absorbers. When this switch is made, absorber No. 1 is switched out of series and becomes an absorber under regeneration. Thus, according to the invention, each of absorbers Nos. 2, 3, 4 and 1 will now act as absorbers No. 1, No. 2, No. 3 and No. 4 respectively, acted originally. This is so because when No. 1 absorber is switched out of operation and onto regeneration the natural gas will be initially fed to absorber No. 2 which now has, in effect, become absorber No. 1 and, at this time, absorber 3 will become absorber 2 and absorber 4 will, in effect, be absorber 3 and so on. In effect, each absorber in turn becomes the first absorber and the prior first absorber is regenerated. The absorbers in group II are operated similarly as described for those of group I employing an automatic analyzer-controller 20. The automatic analyzers 13 and 20 as well as analyzers 30 and 40 of group III and group IV absorbers are merely diagrammatically indicated as connected between absorbers Nos. 2 and 3 of each of the said groups. It is to be understood that these analyzer-controllers are connected to sample effluent in each of the transfer pipes of the group to which they belong. Thus, analyzer-controller 13 can analyze the effluent in pipe 11 and pipe 14 as well as in pipe 12 and this analysis in any particular pipe described is accomplished by a switching means within the automatic analyzer-controller apparatus, as will be understood by one skilled in the art. To make it quite clear, when absorber No. 3 of group I has become, in effect, the second absorber through which the natural gas passes in said group, analyzer-controller 13 will have been switched to pipe 14 and will now no longer, for the while, be detecting and analyzing $C_5$ plus hydrocarbons in pipe 12 but will be doing so for the stream in pipe 14.

Although the aforesaid operation is described as showing the separation of natural gas by removing therefrom in group I $C_5$ plus hydrocarbons, in group II $C_4$'s, in group III C, and in group IV $C_2$ hydrocarbons, it will be understood that this type of chromatographic system is adapted for the separation of other hydrocarbons simply by adjusting the temperature and pressure conditions to maintain the desired phase within the absorbers. The present operation, treating a natural gas, is conducted essentially at ambient temperature and the silica gel in group I and the activated charcoal in group II and the activated carbon in groups III and IV are selected to accomplish the adsorption desired in each group. Since the type of separation here described is dependent upon principles which are well understood, one skilled in the art interpreting the claims will realize that these are to be limited only with respect to the modus operandi and not with respect to the conditions which prevail in any particular absorber or group of absorbers. Thus, the modus operandi of a claimed invention includes within its scope the use of various absorbents and adsorbents and it is for this reason that both types of terminology have been employed in this description. Thus, "ab" and "ad" in the words "absorb" or "absorption" or "absorber" and "adsorb," "adsorption," "adsorber," etc. are in this case intended to be read interchangeably simply because the invention is in the modus operandi and not in whether absorption or adsorption, as the case may be, is going on in a particular adsorber or absorber. In the claims, the term "sorber" is intended to be generic to "absorber," "absorbed," "adsorber," "adsorbed," etc.

The following is an example of an embodiment of the invention in which a fixed-bed adsorption system for hydrocarbon separation is used.

EXAMPLE

One hundred million (100,000,000) s.c.f.d. of natural gas to be separated into following commercial components: pentanes-plus, butanes (mixture of isobutane and n-butane), propane, ethane and fuel gas (predominantly methane).

Composition of available gas:

| Components— | Mol percent |
|---|---|
| Nitrogen | 1.50 |
| Methane | 93.15 |
| Ethane | 3.65 |
| Propane | 0.95 |
| Isobutane | 0.28 |
| n-butane | 0.23 |
| Isopentane | 0.05 |
| n-pentane | 0.04 |
| Hexanes+ | 0.15 |
| | 100.00 |

Pressure available gas _____ p.s.i.g__ 800
Temperature available gas _____° F__ 70

I. *Overall Flow Scheme*

A group of adsorbers is used for each component or product to be separated, as follows:

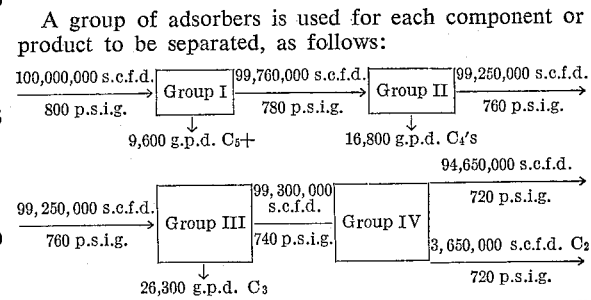

EXAMPLE AVERAGE VAPOR STREAM COMPOSITIONS

| | Inlet Group I | Effluent Group I / Inlet Group II | Effluent Group II / Inlet Group III | Effluent Group III / Inlet Group IV | Effluent Group IV |
|---|---|---|---|---|---|
| Gas Vol., M s.c.f.d | 100,000 | 99,760 | 99,250 | 98,300 | 94,650 |
| Pressure, p.s.i.g | 800 | 780 | 760 | 740 | 720 |
| Composition, Mol %: | | | | | |
| Nitrogen | 1.50 | 1.50 | 1.51 | 1.53 | 1.58 |
| Methane | 93.15 | 93.38 | 93.85 | 94.76 | 98.42 |
| Ethane | 3.65 | 3.66 | 3.68 | 3.71 | |
| Propane | 0.95 | 0.95 | 0.96 | | |
| Isobutane | 0.28 | 0.28 | | | |
| n-butane | 0.23 | 0.23 | | | |
| Isopentane | 0.05 | | | | |
| n-pentane | 0.04 | | | | |
| Hexanes+ | 0.15 | | | | |
| | 100.00 | 100.00 | 100.00 | 100.00 | 100.00 |

II. *Operation of Group I*

This group in this example is for the separation and recovery of the pentanes and heavier molecular weight hydrocarbon. This group, for this example, see FIGURE 2 of the drawing, consists of three fixed-bed adsorbers containing silica gel as the adsorbent. The inlet gas stream passes through two of the adsorbers, in series, while the third adsorber is on regeneration cycle. An economic and practical engineering design consistent with the conditions in this example sizes the equipment for approximately 45 minute cycles and 10 p.s.i. pressure drop per bed while on the main gas flow.

Position 1 is seen in FIGURE 2 of the drawing.

A process chromatographic analyzer may be used for monitoring the various gaseous streams and used to automatically open and close valves. These instruments are made by Perkin-Elmer, Norwalk, Conn.; Consolidated, Pasadena, Calif.; and Beckman in California.

In position 2, see FIGURE 3 of the drawing, note that the lower case letters "b," "c" and "a" in the adsorbers now appear in the order given in this sentence.

Referring in the preceding to position 1 in the figures, bed ($a$) is on regeneration and raw gas is passing in series, respectively, through beds ($b$) and ($c$). The effluent of adsorber ($c$) is monitored for its isopentane content by means of a chromatographic analyzer.

Since group I in this example is operated to recover a mixture to consist of isopentane, n-pentane and heavier molecular weight hydrocarbons from the gas stream, the key component monitored is isopentane. The other of these hydrocarbons (n-pentane and heavier) are more strongly adsorbed than isopentane, and, therefore, isopentane is the first of these components to appear in the effluent.

When the effluent of adsorber ($c$) shows a trace quantity of isopentane, such as .01 mol percent by the chromatograph monitor, the valves are switched from position 1 to position 2 either manually by the operator on signal of the chromatograph or the chromatograph signal is instrumented to make the switch automatically. In either case, the bed ($b$) is next to go on regeneration cycle, and bed ($a$) (the one freshly regenerated and cooled) goes on adsorption cycle as the second bed in series. The flow of the raw gas is then first to bed ($c$) and then to bed ($a$) as shown in position 2.

The regeneration of the saturated bed is accomplished by circulation of hot gas as shown in the figure, or by several alternates. Propane product from group III or butanes product from group II could be passed through a vaporizer and the hot vapor at about 600° F. could be used for regeneration.

III. *Operation of Group II*

This group, in this example, is for the separation and recovery of butanes (isobutane and normal butane). This group, for this example, consists of three fixed-bed adsorbers containing activated charcoal. The operation in principle is parallel to the operation of group I. The chromatograph for this group signals cycle switching when a trace, such as 0.01 mol percent, of isobutane appears in the effluent of this group.

Regeneration of beds in this group is accomplished by circulation of hot gas, as diagrammed for group I, or by use of hot butanes vapor itself, or by use of superheated steam. The latter two methods yield the highest purity butanes product.

IV. *Operation of Group III*

This group, in this example, is for the separation and recovery of propane. This group, for this example, consists of three fixed-bed adsorbers containing activated charcoal. The operation in principle is parallel to the operation of group I. The chromatograph for this group signals cycle switching when a trace, such as 0.01 mol percent, of propane appears in the effluent of this group.

Regeneration of beds in this group is accomplished by circulation of hot gas, as diagrammed for group I, or by use of hot propane vapor itself, or by use of superheated steam. The latter two methods yield the highest purity propane product.

A principle of the system of the invention is to operate a series of groups of adsorbers for the separation of the light hydrocarbons such as those present in raw natural gas. As already noted, there is a group for each component or product to be separated. Each of these adsorbers contains adsorbent and is operated specifically for the material it is to recover.

The example gives three beds in each group but there can be more or less. Two beds are the minimum. This allows one bed on regeneration while one is on adsorption, but is not as efficient as to fuel requirement for regeneration or product recovery.

The example shows use of a chromatograph to monitor effluent of the second adsorber in series in each group to signal cycle switching.

It is a minor variation to base the cycle switching by monitoring the effluent of the first adsorber in series, except that in this case the switch is made when the concentration of the component being recovered reaches a predetermined level near its concentration in the inlet, showing that saturation has been reached or approached.

Of course, with possible loss in efficiency, the beds can be regenerated at set time intervals instead of using of the chromatograph.

Reasonable variation and modification are possible within the scope of the foregoing disclosure, drawing and the appended claims to the invention, the essence of which is that there has been provided a modus operandi for the operation of a plurality of groups of several absorbers each in a manner to insure in a once-through operation the separation into substantially pure gases of a mixture of gases, in each group serially using each absorber as a first absorber, second absorber, third absorber, etc. and analyzing downstream of a first absorber for undesirable carry-over of gas to be removed in the group of absorbers to which it belongs and whenever this gas reaches an undesirable amount adding a further absorber to the group of absorbers in any particular group substantially as set forth and described herein.

I claim:

1. A method for the separation of a mixture of gases into individual gases comprised in said mixture which comprises passing said mixture into and through several groups of sorbers, each group of sorbers being operated as follows: conducting the mixture into a first of said groups of sorbers and in said first group conducting said mixture through at least two sorbers in series, testing the effluent passing from a first sorber of said series to a second sorber of said series for gas to be removed from said mixture in said group and whenever said gas, to be removed in said group, exceeds a predetermined value in said testing of gas passing from a first to a second sorber, passing the effluent from the second sorber in said series to a third sorber in series in said group, and obtaining from each of said second and said third sorbers in said series when used a gas stream substantially free from the gas to be removed in said group, and passing the residue gas from said group of sorbers to a second group of sorbers operated serially as described herein to remove from said mixture a second component yielding residue gas substantially free from said second component.

2. The separation of natural gas containing $C_2$–$C_4$ plus hydrocarbons into the following streams: a stream consisting essentially of $C_2$ hydrocarbons, a stream consisting essentially of $C_3$ hydrocarbons, and a stream consisting essentially of $C_4$ and any heavier hydrocarbons, which comprises passing said gas into a first sorber of a first group of sorbers and from the first sorber to a second sorber, detecting between said first and second sorbers undesirable $C_4$ plus hydrocarbon content and whenever this content exceeds a predetermined maximum adding a third sorber downstream of the second sorber of said first group of sorbers thus to insure complete separation of $C_4$ plus hydrocarbon from the natural gas in said first group of sorbers, passing residual gas from said first group of sorbers to a second group of sorbers operated as described for said first group of sorbers to remove from said natural gas $C_3$ hydrocarbon, and obtaining an off-gas consisting essentially of $C_2$ hydrocarbon.

3. The separation of natural gas containing $C_3$–$C_5$ plus hydrocarbons into the following streams: a stream consisting essentially of $C_3$ hydrocarbons, a stream consisting essentially of $C_4$ hydrocarbons, and a stream consisting essentially of $C_5$ and heavier hydrocarbons, which comprises passing said gas into a first sorber of a first group of sorbers and from the first sorber to a second sorber, detecting between said first and second sorbers undesirable $C_5$ plus hydrocarbon content and whenever this content exceeds a predetermined maximum adding a third sorber downstream of the second sorber of said first group of sorbers thus to insure complete separation of $C_5$ plus hydrocarbon from the natural gas in said first group of sorbers, passing residual gas from said first group of sorbers to a second group of sorbers operated as described for said first group of sorbers to remove from said natural gas $C_4$ hydrocarbon, and obtaining an off-gas consisting essentially of $C_3$ hydrocarbon.

4. A method for the separation of a mixture of gases into individual gases comprised in said mixture which comprises passing said mixture into and through a group of sorbers to remove a component therefrom, said group of sorbers being operated as follows: conducting the mixture into a first of at least two sorbers in series, testing the effluent from the first sorber of said series which is being passed into the second sorber in said series for the component to be removed from said mixture in said group while said effluent is passing into the second sorber in said series, and whenever in said testing of gas passing from a first to a second sorber said component to be removed in said group reaches a predetermined value above which the gas effluent from said second sorber will not be practically free from the gas to be sorbed in said group, passing the effluent from the second sorber in said series to a third sorber in series in said group, and obtaining from each of said second and said third sorbers in series in said group when used a gas stream substantially free from gas to be removed in said group.

5. The separation of natural gas containing $C_1$–$C_5$ plus hydrocarbons into the following streams: a stream consisting essentially of $C_1$ hydrocarbons, a stream consisting essentially of $C_2$ hydrocarbons, a stream consisting essentially of $C_3$ hydrocarbons, a stream consisting essentially of $C_4$ hydrocarbons, and a stream consisting essentially of $C_5$ and heavier hydrocarbons, which comprises passing said gas into a first sorber of a first group of sorbers containing silica gel and from the first sorber to a second sorber, detecting between said first and second sorbers undesirable $C_5$ plus hydrocarbon content and whenever this content exceeds a predetermined maximum adding a third sorber downstream of the second sorber of said first group of sorbers thus to insure complete separation of $C_5$ plus hydrocarbon from the natural gas in said first group of sorbers, passing residual gas from said first group of sorbers to a second group of sorbers containing activated charcoal operated as described for said first group of sorbers to remove from said natural gas $C_4$ hydrocarbon, passing residue gas from said second group of sorbers to a third group of sorbers containing active carbon operated as described for said first and second groups of sorbers to remove $C_3$ hydrocarbon and then, finally, to a fourth group of sorbers containing active carbon also operated as described for said earlier groups of sorbers to remove $C_2$ hydrocarbon from said gas stream obtaining an off gas consisting essentially of $C_1$ hydrocarbon.

References Cited in the file of this patent

UNITED STATES PATENTS

| | | |
|---|---|---|
| 1,533,716 | Voress et al. | Apr. 14, 1925 |
| 1,892,428 | Fonda | Dec. 27, 1932 |
| 2,211,162 | Ray et al. | Aug. 13, 1940 |
| 2,782,866 | Etherington et al. | Feb. 26, 1957 |
| 3,002,583 | Findlay | Oct. 3, 1961 |